United States Patent [19]

Matsuda et al.

[11] Patent Number: 4,911,267

[45] Date of Patent: Mar. 27, 1990

[54] OILER WITH DRIPPAGE PREVENTING DEVICE

[75] Inventors: Hiroshi Matsuda, Machida; Eiji Sugahara, Sagamihara, both of Japan

[73] Assignee: Yohwa Trading Co., Ltd., Tokyo, Japan

[21] Appl. No.: 226,849

[22] Filed: Aug. 1, 1988

[30] Foreign Application Priority Data

Aug. 31, 1987 [JP] Japan ................................ 62-133569
Mar. 3, 1988 [JP] Japan .................................. 63-27600

[51] Int. Cl.⁴ ........................ F01M 1/00; F16N 11/10; F16N 13/16
[52] U.S. Cl. ........................................ 184/6; 184/106; 184/39.1; 184/29; 184/6.14; 239/103
[58] Field of Search ................. 184/106, 29, 39.1, 7.4, 184/6.14, 6; 239/103, 120, 121, 122

[56] References Cited

U.S. PATENT DOCUMENTS

| | | | |
|---|---|---|---|
| 1,675,002 | 6/1928 | Steiner | 239/103 |
| 1,828,463 | 10/1931 | Hammers | 239/103 |
| 3,374,863 | 3/1968 | Kozlowski et al. | 184/29 |
| 3,420,182 | 1/1969 | Zuhn | 184/29 |
| 3,595,342 | 7/1971 | O'Leary | 184/39.1 |
| 3,693,757 | 9/1972 | Callahan et al. | 184/39.1 |
| 4,157,132 | 6/1979 | Kramer | 184/7 D |
| 4,262,775 | 4/1981 | Webb | 184/6.4 |
| 4,262,776 | 4/1981 | Wilson et al. | 184/15 R |
| 4,368,803 | 1/1983 | Dombroski et al. | 184/15 B |
| 4,520,902 | 6/1985 | Snow | 184/29 |
| 4,527,661 | 7/1985 | Johnstone et al. | 184/6.1 |
| 4,754,848 | 7/1988 | Azzopardi et al. | 184/6.14 |

FOREIGN PATENT DOCUMENTS

| | | | |
|---|---|---|---|
| 58-72797 | 4/1983 | Japan . | |
| 93595 | 5/1984 | Japan | 239/120 |
| 165445 | 2/1934 | Switzerland | 239/121 |

Primary Examiner—Henry A. Bennet
Assistant Examiner—Denise L. Ferensic
Attorney, Agent, or Firm—Wenderoth, Lind & Ponack

[57] ABSTRACT

An oiler with a drippage preventing device, to jet lubricating oil on a die or workpiece placed in a press machine. A freely inclinable arm is attached to a freely movable stand, and a nozzle is attached to the arm. A compressed-air-driven high-pressure booster pump sucks up lubricating oil from an oil tank and jets it from the nozzle onto the die or workpiece as a fluid under pressure. A drip pan is mounted on the nozzle and is connected to a compressed-air-driven vacuum block, with the vacuum block functioning to withdraw the lubricating oil from the drip pan and into the oil tank so as to recirculate it in the oiler. The pump, vacuum block, oil tank and associated controls can be housed together in a casing.

4 Claims, 4 Drawing Sheets

OILER WITH DRIPPAGE PREVENTING DEVICE

FIELD OF THE INVENTION

The present invention relates to an oiler for jetting a lubricating oil, as a fluid against a workpiece fed sequentially into press and moe particularly to an oiler for jetting the lubricating oil against the workpiece or dice, not as an oil mist, but as a fluid, so as to prevent creak or bit between the work and the die in the press machine.

DESCRIPTION OF PRIOR ART

Most conventional oilers are of such a structure that the nozzle is arranged sideways and the lubricating oil, changed to an oil mist, is sprayed on the workpiece from the side. The mist-like lubricating oil has some serious problems in that it pollutes the air and worsens the working enviroment and in consequence exerts a harmful influence upon the worker's health.

Further, for example, in the official gazette of Japanese Patent Application Disclosure No. 72797, 1983, an oiler has been disclosed, in which the nozzle is attached to a certain part over the die with its spray port faced downward and the lubricating oil is sprayed inside the dice from overhead. In this oiler, the lubricating oil is sprayed directly inside the dice, so that a harmful influence to the working environment is considerably reduced. However, this art has had such unavoidable problems as in sufficient space to mount the nozzle over the die-where it is required to spray the lubricating oil against the dice or workpiece during the press work, its mounting position interferes with a transfer feed device, or, if the work is of large or extraordinary form, the nozzle can not be arranged at a space over the die.

OBJECTS OF THE INVENTION

The general object of the invention is therefore to clear up the problems of the prior art such as the air being polluted because the lubricating oil is sprayed as an oil mist, and to provide a novel and unique oiler to jet the lubrciating oil against the workpiece as a fluid by means of a high pressure booster pump.

As the oiler according to the invention is designed to jet the lubricating oil against the work or dice as a fluid as noted above, if the oil is jetted with the nozzel slanted up- or downwards and/or faced sideways, a certain quantity of oil adhered to a fringe of the nozzle head jet port will drip along the exterior of th nozzle during the jet operation and stain the base floor around the nozzle, unless an appropriate contrivance is fitted for the oiler. Also, there is the possibility that the oil remains inside the nozzle or arranged pipe, hose or tube, and that the oil discharged from the high pressure booster pump leaks out of the jet port of the nozzle head and drips along its exterior around the nozzle, unless the oil drippage preventing device according to the present invention is fitted for this oiler. These are a phenomenon of so-called "oil-dripping", which causes some serious problems that stain a peripheral area of the nozzle or base floor and that consume the oil wastefully.

As noted before, the method where the nozzle is arranged inside the die and the lubricating oil sprayed directly against the dice or work scarcely creates such problems even if the lubricating oil is sprayed as a oil mist, however, the nozzle in general cannot be arranged in the die. In prior machinery there are many cases where it is impossible to arrange the nozzle in the die for the reasons that a space between upper and lower dice is narrow a slide ascends/descends at frequent intervals and that a feed mechanism, projecting a number of clamps in front and rear as in a transfer feed device, is generally employed in recent consecutive press work. In such cases, a necessity is brought about for the lubricating oil go be sprayed against the work or dice from its lateral direction with the nozzle slanted up, down, or sideways, and as a consequence the aforementioned problem of "Oil-Drip-page" is produced. Therefore, it is also an object of this invention to solve such problems completely and to provide an up-to-date oiler with drippage preventation in which a so-called "drip pan" is fitted to the circumferential fringe of thenozzle head jet port and the dripped oil is gathered therein and sucked up and withdrawn into an oil tank by means of a vacuum block and the thus-withdrawn oil is then sucked up and pressurized by means of a high pressure booster pump and discharged as a fluid from the nozzle.

In addition to the above, another object of this invention is to provide the oiler with a drippage preventing device to which any shape of drip pan, e.g., round, eccentric, square and/or inverse triangle can be fitted freely interchangeable so as to make it easy to utilize this oiler in conformity with the work and the position to be lubricated.

Yet another object of the invention is to provide the oiler with a drippage preventing device wherein the high pressure booster pump is fitted with an oil chamber adjusting device, and in order to save lubricating oil an oiling quantity can be controlled in a freely adjustable manner by arranging solenoid valves for switching on/off a discharge of compressed air into the booster pump and vacuum block, as well as timers and counter for setting an actuating time and frequency for the solenoid valves.

A further object of this invention is to provide such an oiler with a drippage preventing device that the nozzle member is separated from the other member and supported by an independent stand to make it possible to use it at an easily lubricatable position and at an adjustable slant angle with the other oiling control members housed together in a freely transferable independent casing in order to make centralized remote control of the oiling quantity possible.

BRIEF SUMMARY OF THE INVENTION

In order to embody the aforementioned objects, the present invention aims at providing an oiler with a drippage preventing device free of the working environment pollution and oil waste. To this end, an oil pan is fitted to a cir cumferential fringe of a nozzle head jet part. A high pressure booster pump with a piston reciprocated by compressed air sucks up the lubricating oil inside an oil tank, pressurizes it and jets it against the workpiece from the nozzle as a fluid. A vacuum block sucks up the lubricating oil dripped in the drip pan of the nozzle head by use of the compressed air and withdraws it into the oil tank.

Various shapes of drip pans, e.g., round, square and/or inverse triangle can be attached in a freely interchangeable manner in conformity with the lubricating work and position to be lubricated.

Moreover, an oil chamber adjusting device is provided for the oil tank including solenoid valves for opening and closing the path of the compressed air to and from the booster pump and vacuum block, and timers and counter for setting the actuating time and frequency for the solenoid valves, thereby making it possible to control the oiling quantity in a freely adjustable manner.

Furthermore, the present inventon provides the nozzle head fitted with the drip pan as a single unit separate from the other oiling members and supported in a freely inclinable manner by a freely transferable independent stand. A freely transferable casing houses the other oiling members, e.g., the solenoid valves, timer, counter, oil tank, high pressure booster pump, vacuum block and compressed air source connector, as a unit. Flexible hoses connect the high pressure booster pump and vacuum block of the casing to the nozzle and drip pan on the stand, thereby making centralized remote

DETAILED DESCRIPTION OF PREFERRED EMBODIMENTS

The present invention will be described in connection with the accompanying drawings.

Figure 1:
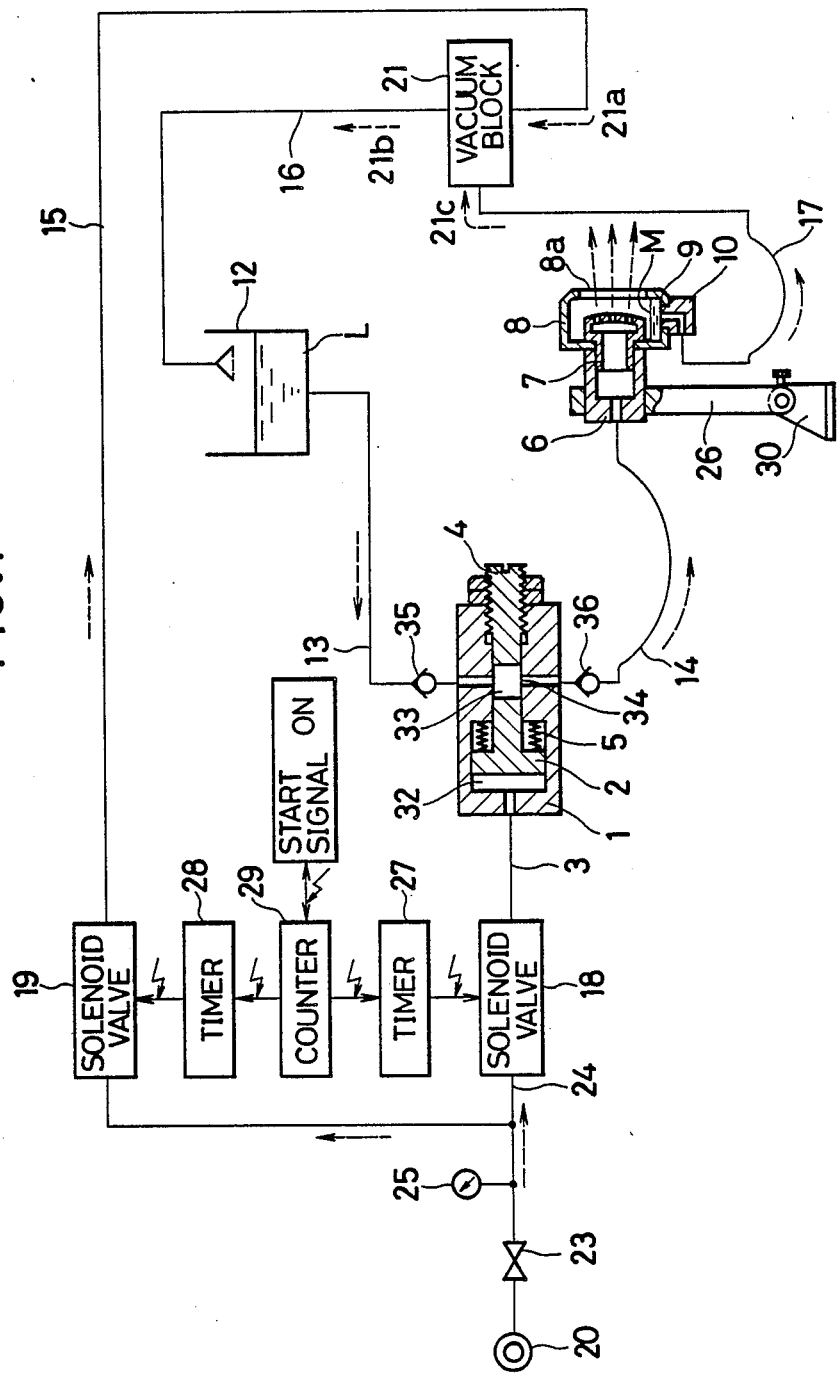
FIG. 1 is a general composition diagram of the oiler a with drippage preventive device according to the invention.

In FIG. 1, the reference number 20 designates a compressed air source, and 24 is an air supply means (e.g., a tube, hose or pipe) for feeding the air separately to solenoid valve 18 & 19 from compressed air source 20. Likewise, 23 is a shut-off cock, and 25 is a pressure gauge. The solenoid valve 18 is a three-port two-position changeover valve and functions for a set time of the timer 27. When the solenoid valve 18 functions, the compressed air will be fed to an air chamber 32 of a high pressure booster pump via an air feed tube 3 from the compressed air source 20. Position 2 will thereby be advanced, resisting a pressing force of return spring 5, and in consequence the lubricating oil (L) in oil chamber 33 will be pressurized and the thus-preferred oil will then be fed via outlet 34 and feed means (tube, hose or pipe) 14 into a nozzle 7 and finally jetted against the work, as a fluid, from jet hole 7a of the nozzle. As used herein the term "fluid" is meant to refer to a stream of liquid without entrained air.

When the solenoid valve 18 ceases its motion after the set tme of timer 27 has passed away, the compressed air inside the air chamber 32 will be exhausted and the piston 2 will be returned to the original state by the return spring 5. At this time, the lubricating oil (L) inside oil tank 12 will be sucked into the oil chamber 33 via an oil supply means (tube, hose or pipe) 13. The reference numbers 35 and 36 show a check valves respectively, which ensures sucking, pressurizing and discharging of the lubricating oil (L) to and from the oil chamber 33.

The oil chamber adjusting device 4 is designed to change the oil quantity by turning a member screwmounted to the oil chamber 33 and thereby changing the volume of the oil chamber 33, thus adjusting the discharge quantity of oil pressurized by the piston 2.

In a case where the viscosity of lubricating oil (L) is high, the stroke speed of piston 2 to pressurize and discharge the lubricating oil (L) will naturally be expected to be low due to viscosity resistance, however, it is possible to correct the reduction in stroke speed of the piston 2 by setting the actuation time of the timer 27 slightly longer than that of the ordinary speed.

Figure 2:
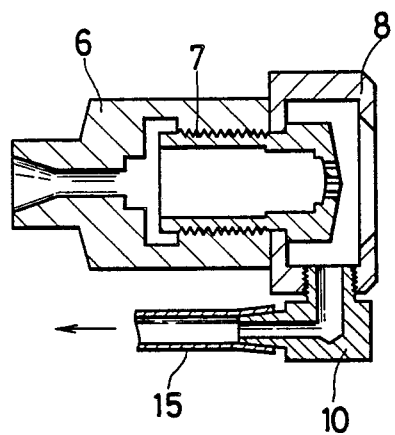
FIG. 2 is a cross-section of the nozzle with a drip pan acording to the invention.

FIG. 2 shows the nozzle 7. The nozzle 7 is screwed into a body 6 that one side of a drip pan 8 is held the body and the nozzle to be pinched therein. The drip pan 8 has encircles a circumferential fringe of the jet hole 7a of the head of the nozzle 7 and has an opening hole 8a in the front.

For the size of the opening hole 8a, it is desirable to have a size such as not to obstruct the lubricating oil (L) jetted from the jet port 7a. At the bottom of said drip pan 8, an outlet hole 9 is formed and drain hardware 10 is attached thereto. Further, a drain tube 17 is coupled to said drain hardware 10.

When the nozzle 7 is arranged in a slanted posture or sideways, the drip pan 8 should be so mounted to the nozzle 7 that the outlet hole 9 is positioned at the bottom of drip pan 8. In this way, initiating the oiling operation, the lubricating oil (M) dripped from the circumferential fringe of the jet port 7a will be all collected into the drip pan and then to the outlet hole 9 at the bottom thereof.

The present invention, so as to widen the practical application range, illustrates various types of drip pans 8 in FIGS. 6A, 6B, 6C and 6D, i.e., a round shape 8a, eccentric shape 8b, square shape 8c and inverse triangle shape 8d. It is advisable to use these drip pans in conformity with the method, position and other factors of the lubricating work, because any of these drip pans according to the invention can be freely inter changable attached to the the nozzle.

Figure 3:
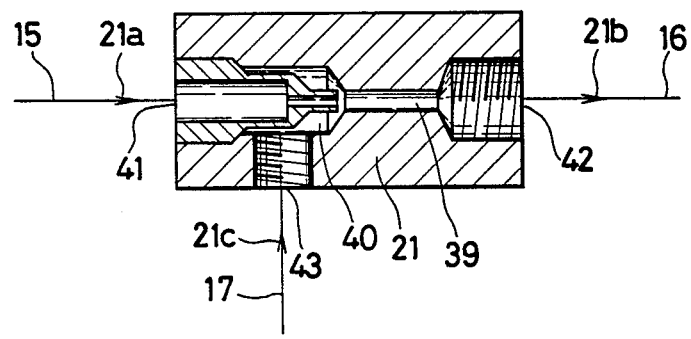
FIG. 3 is a cross-section of the vacuum block according to the invention.

FIG. 3 shows a vacuum block 21. The reference numbers 41, 42 and 43 respectively show piping port of the vacuum block 21, and the air feed means 15, air exhaust means 16 and oil drain tube 17 are each coupled thereto. The reference number 39 is a vent hole and 40 is a cavity. The compressed air fed through the air feed means (e.g., hose,tube, pipe, etc.) 15 by function of solenoid valve 19 passes through vent hole 39 from the head of part 41 and is exhausted via the air exhaust means (e.g., tube, hose or pipe) 16 from the part 42. The reference numbers 21a & 21b show these air feed directions. At this time, the interior of the cavity 40 will be under a vacuum condition and its resultant sucking force will act in a direction as shown by the arrow 21c. Accordingly, the lubricating oil collected in the outlet hole 9 of the drip pan 8 will be sucked through the drain tube 17 and discharged into the air exhaust tube 16 together with the compressed air passing through the vent hole 39 and then withdrawn to the oil tank 12. The solenoid valve 19 is a 3-port 2-position changeover valve having the same structure as that of the aforementioned valve 18 and functions during the set time of a timer 28 which acts to prevent the compressed air from being wasted by setting a proper actuation time.

In a case where the oiling is performed for the workpiece or dice when the press is in motion, the action of the timers 27 & 28 should be interlocked wth the press motion. The timers 27 & 28 function whenever a rotary cam switch (unillustrated) of the press emits a start signal (ON) every press stroke. On the other hand, instead of such method where the actuating frequency of the timers 27 & 28 are synchronizes with the press stroke, by reducing the frequency to once every several strokes, the oiling quantity will be reasonably reduced. In such a case, all that is needed is to set the required frequency of the counter 29.

In this way, carrying out three operations collectively the oil chamber content volume adjustment by the oil chamber adjusting device 4; actuating time adjustment of the timer 27; and actuating frequency adjustment of the counter 29, it is possible to properly control the oiling quantity. Also, even in a case where the oiling is performed against the workpiece fed not only by a press machine but also by a consecutive transfer feeder, the oiler according to the invention can function by receiving a start signal (ON) emittd from said consective transfer feeder.

When doing the oiling manually (e.g. when carrying out a test run of the oiler) against the workpiece or dice, the operation switch 45 (FIG. 5) built in the casing 31 is switched to ON, the start signal (ON) will then be emitted and the oiler will thereby be actuated through the sequential actions of the timers 27 & 28 as well as the solenoid valves 18 & 19. In this case, the oiler functions and jets the oil once per one start signal emitted by the action of operation switch 45. Even in the case of manual oiling, the oiling quantity can be adjusted by setting the timers 27 & 28 to optional values and at the same time adjusting the oil chamber adjusting device 4 properly.

The present invention will now be described for the embodiment of the oiler intended to make centralized remote control possible.

The oiler according to the invention, as noted before, is separated into the the nozzle 7 housed on an independent stand 30 to support it and the casing unit 31 housing the other operating members together.

Figure 4:
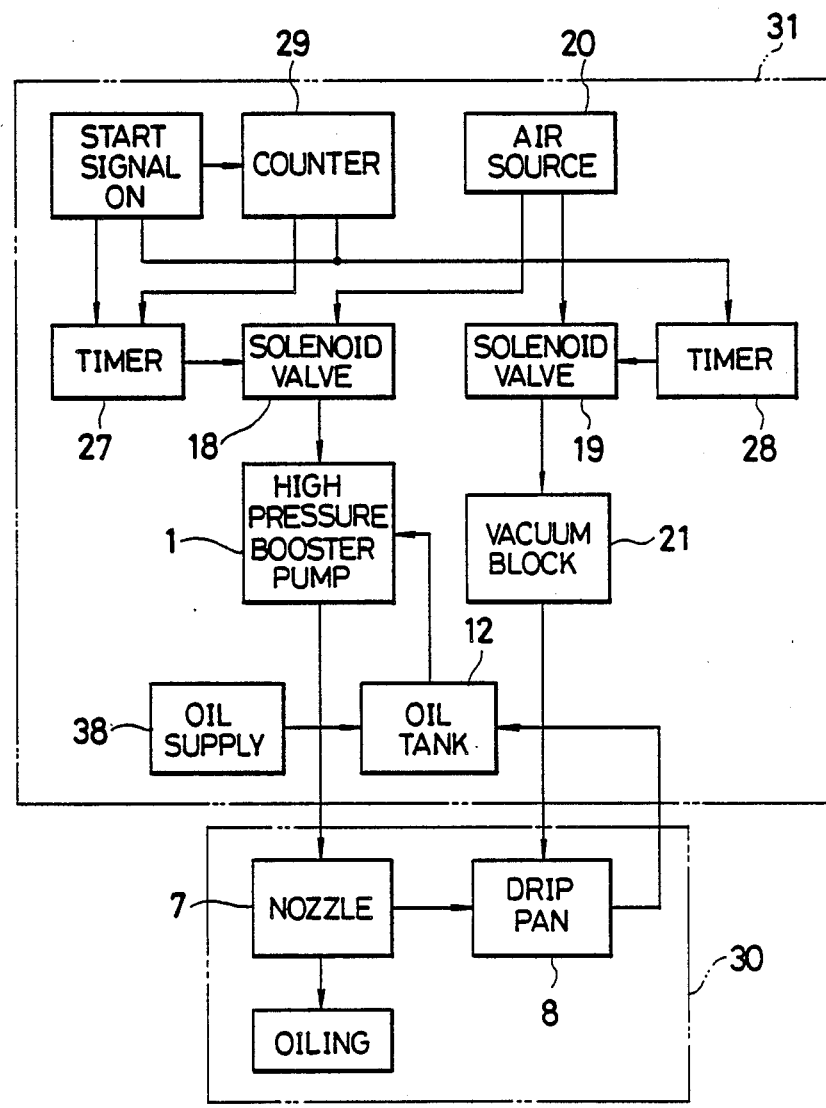
FIG. 4 is a block diagram of the oiler with a drippage preventive device according to the invention.

As seen in FIG. 1, the body 6 of the nozzle 7 is supported by an arm 26 pivotably adjustable on a freely transferable stand 30. Accordingly, the nozzle 7 can be settled at an easily lubricatable and inclinable position in conformity with the form of the object to be oiled, i.e., of the workpiece or dice (unillustrated). Also, as in FIG. 4, the solenoid valves 18 & 19, timers 27 & 28, counter 29, oil tank 12, high pressure booster pump 1, vacuum block 21 and compression air source 20 are housed together in the freely transferable independent casing 31, and The connections between pump 1 and vacuum block 21 of casing 31 and nozzle 7 and drip pan 8 of the stand are by a detachable flexible hose.

There may be some cases where a length of the oil feed means (hose,tube,pipe) 14 between nozzle 7 and the high pressure booster pump varies occasionally and its variation influences the oiling quantity because each of the stand 30 supporting the nozzle and the casing 31 is to be located in an optimum position to lubricate the work. However, this oiler can easily correct such variation because a contrivance for adjusting the oiling quantity is incorporated in this oiler.

Figure 5:
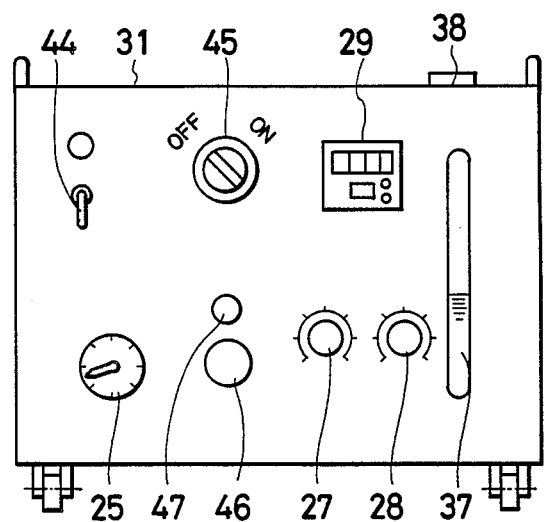
FIG. 5 is an elevation view of the casing according to the invention.
Figure 6A:
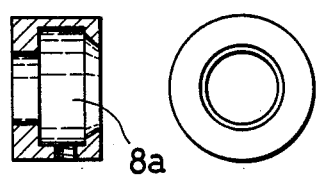
FIG. 6a is a round pan according to the the invention.
Figure 6B:
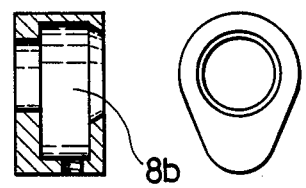
FIG. 6b is a eccentric drip pan according to the invention.
Figure 6C:
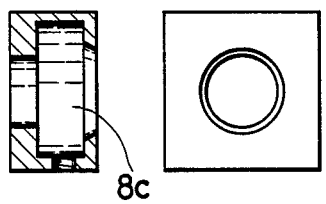
FIG. 6c is a square drip pan according to the invention.
Figure 6D:
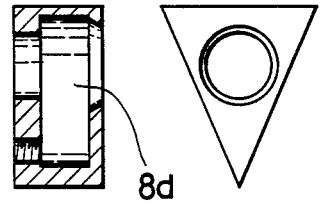
FIG. 6d is an inverse triange drip pan according to the invention.

As illustrated in FIG. 5, a setting for the actuating time of the timers 27 & 28 and counter 29, pressure gauge 25 for compressed air source 20, oil gauge 37 for oil tank 12, buzzer 46 with stop p.b. for out-of-oil indication and monitor member for out-of-oil indication lamp 47, manual (or test) operation switch 45 and power switch 44 are all mounted on the front operation panel of casing 31, which makes it possible to perform a centralized remote control of both the oiling quantity adjustment and the lubricating oil (L) supply.

The operation of the present invention will be described below for the oiler comprising the aforementioned structure. Initially, the stand 30 is moved near the workpiece or dice, the arm 26 is inclined properly and the nozzle 7 is located at an appropriate position with it slanted properly. Transmitting the start signal (ON) to the solenoid valves 18 & 19, will then cause the oiler to function.

When the solenoid valve 18 initiates its motion, compressed air will be fed to the air chamber 32 of the high pressure booster pump 1 and cause the piston 2 to move forward. When the solenoid valve 18 ceases its motion after the set time of the timer 27, the compressed air will be exhausted and at the same time the piston 2 will be returned to the original position by the return spring 5. The piston 2 acts to suck up the lubricating oil (L) filled in the oil tank 12 in its backward motion and pressurize said oil (L) in its forward motion and jet thus-pressurized oil against the work or dice in the fluid state from the nozzle 7. At this time, the piston 2 reciprocates once per one start signal and the nozzle 7 jets the oil (L) likewise.

At that time, the lubricating oil (M) dripped from the circumferential fringe of the jet port of the nozzle 7 is gathered in the drip pan 8. On the other hand, the compressed ar is fed to the vacuum block 21 by the function of solenoid valve 19, and said vacuum block 21 acts to suck up lubricating oil (M) gathered in said drip pan and withdraw it into the oil tank 12. This contrivance serves effectively to prevent oil drippage and save the lubricating oil (L).

Also, the oil chamber adjusting device 4 functions to adjust the content volume of the oil chamber 33 and to control the quantity of lubricating oil (L) to be sucked in oil chamber 33. The sucked oil (L) can be adjusted practically constantly because thus-sucked oil (L) is sequentially pressurized and ceaselessly discharged to the nozzle.

Further, the solenoid valve 18 & 19 are contrived to function for a set time of the timers 27 & 28. Therefore, adjusting the set time of the timer 27 will make it possible to regulate the oiling quantity, and likewise adjusting timer 28 will make it possible to regulate the compressed air feed quantity discharged via the vacuum block 21.

Furthermore, when operating the oiler in interlock with a press machine, the oiler functions synchronously with the start signal (ON) emitted from said press during every stroke thereof. To function the oiler intermittently, transmit the start signal by regulating the action of the counter 29 and actuate the solenoid valves 18 & 19 intermittently at the rate of once per several frequencies of the counter 29.

In this way, in addition to the adjustment of the oil chamber adjusting device 4, setting the timer 27 and counter 29 respectively to an optimum value required for the lubrication work, it will be possible to attain both oiling quantity adjustment and lubricating oil saving simultaneously. it may be noted that the adjustment of the oiling quantity can easily be performed by centralized operation of the control members on the casing 31.

As may be understood from the above, the oiler according to the invention possesses the foregoing structure and function and exerts superior effects of various kinds. These characteristics may be summarized as follows.

There is no danger that the luricating oil scatters in the air and the worker breathes it as in the spray system, because the oiler according to the invention jets the oil against the work or dice as a fluid. Therefore, the proposed oilers serves to greatly improve the working environment.

Even if the lubricating oil is applied to th work with the nozzle inclined or mounted sideways, the oiler according to the invention does not stain its peripheral area because the lubricating oil dripped from the jet hole is all gathered in the drip pan. Also, the lubricating oil remaining in the nozzle after jetting or which leaks from the pressure pump is all gathered in the drip pan, so that the peripheral area can always be kept clean. Thus, as the peripheral area is never stained even if the nozzle is inclined, it is possible to mount the nozle at the proper position and angle against the workpiece or dice of the object to be lubricated.

Further, as the lubricating oil gathered in the drip pan can easily be circularized successively in the oil tank by the vacuum block utilizing the compressed air, it is possible to prevent the oil from being wasted and save it accordingly.

Furthermore, as the compressed air controlled by the solenoid valves, timers and counter are employed in the actuation of the high pressure booster pump and the vacuum block, the shole structure of the oiler is simple and the ease of operation is improved over conventional devices.

In addition to the basic adjustment of the oiling quantity by the oil chamber adjusting device of the high pressure booster pump, as it is very simple to adjust the oiling quantity properly by setting the actuating time of the timer and the actuating frequency of the counter to the desired values respectively, the lubricating oil can be saved. In addition, the adjustment of the oiling quantity can be performed very effectively because the adjusting devices for the oiling quantity are housed together in a single independent casing together with the oil reservoir tan and operation devices.

Still further, even if a change should in the actuation time of the high pressure booster pump should occur due to a viscosity change in the lubricating oil used, the oiling quantity can always be kept proper because the actuation thime of said booster pump can simply be corrected by adjusting the timer.

Moreover, in addition to the nozzle being mountable at an easily lubricatable position against the work or dice of the object to be oiled, as the casing unit can also be arranged at an easily operable centralized control position, even if the hose length between nozzle and high pressure booster pump varies and a correction of oil supply quantity is required, there is no hindrance because the oil supply quantity correction can be performed through a simple adjustment of the present oiler.

In addition, when employing thi oiler in the oiling of a workpiece or dice located in a consecutively processing press, the oiling can simply be automated with the use of a start signal emitted at every stroke of the press and at the same time the automated oiling can be fulfilled further by oiling quantity adjustment including intermittent oiling adjustment interlocked with the press stroke.

Over and above these, the automated of the oiling will also be realized simply in such an oiling process for the workpiece a is fed, not only by the press machine, but also by a consecutive transfer feed means if th start signal emitted therefrom can be used, and at the same time both purposes of oil drippage prevention and oil savings will also be realized.

Besides, it is possible to perform the effective oiling work because various shapes of drip pans, e.g., round, eccentric, square and/or inverse triangle can selectively be attached to the nozzle in conformity with a method of lubrication position to be lubricated, and other oiling conditions.

We claim:

1. An oiler with a drippage prevention device, comprising:
   a tank for holding lubricating oil;
   a high-pressure booster pump for receiving the oil from said tank and expelling the oil under pressure;
   nozzle means for spraying oil as a fluid under pressure;
   first hose means for guiding the oil expelled from said pump to said nozzle means;
   a freely movable stand for supporting said nozzle means;
   an arm having a first end pivotably adjustably connected to said stand and a second end connected to said nozzle means;
   a drip pan mounted on said nozzle means for receiving the oil dripped from said nozzle means;
   second hose means for guiding the oil received in said drip pan to said tank; and
   a vacuum block intermediate said second hose means for urging the oil through said second hose means.

2. An oiler as in claim 1, wherein said pump includes a reciprocable piston driven by compressed air and defining an oil chamber, and means to adjust the volume of said oil chamber.

3. An oiler as in claim 2, further comprising:
   first and second solenoid valves to control the flow of compressed air to said pump and said vacuum block, respectively; and
   timer and counter means for controlling the actuation times and frequencies of said valves.

4. An oiler as in claim 3, wherein at least said tank, said pump, said vacuum block, said valves and said timer and counter means are housed together within a casing.

* * * * *